US006965344B1

(12) United States Patent
Halsey et al.

(10) Patent No.: US 6,965,344 B1
(45) Date of Patent: Nov. 15, 2005

(54) FIREFIGHTER LOCATOR

(75) Inventors: J. Doss Halsey, Falls Church, VA (US); Douglas J. Wolff, New Windsor, MD (US)

(73) Assignee: Information Systems Laboratories, Inc., San Diego, CA (US)

(*) Notice: Subject to any disclaimer, the term of this patent is extended or adjusted under 35 U.S.C. 154(b) by 870 days.

(21) Appl. No.: 09/691,751

(22) Filed: Oct. 18, 2000

(51) Int. Cl.$^7$ .................................................. G01S 5/04
(52) U.S. Cl. ....................................... 342/442; 342/462
(58) Field of Search ................................ 342/457, 464, 342/357.06, 442, 465, 463; 701/213

(56) References Cited

U.S. PATENT DOCUMENTS

| | | | | |
|---|---|---|---|---|
| 3,680,121 | A * | 7/1972 | Anderson et al. | 342/457 |
| 4,021,807 | A * | 5/1977 | Culpepper et al. | 342/442 |
| 4,728,959 | A | 3/1988 | Maloney | |
| 5,327,144 | A | 7/1994 | Stilp | |
| 5,534,876 | A | 7/1996 | Erickson | |
| 5,583,517 | A | 12/1996 | Yokev | |
| 5,596,330 | A | 1/1997 | Yokev | |
| 5,664,006 | A | 9/1997 | Monte | |
| 5,790,076 | A | 8/1998 | Sypniewski | |
| 5,999,131 | A | 12/1999 | Sullivan | |
| 6,166,691 | A * | 12/2000 | Lindqvist | 342/465 |
| 6,239,748 | B1 * | 5/2001 | Gilhousen | 342/442 |

OTHER PUBLICATIONS

Matthew S. Reynolds; A Phase Measurement Radio P ositioning System for Indoor Use; Thesis; Massachusetts Institute of Technology; Jul. 15, 1999.

* cited by examiner

*Primary Examiner*—Thomas H. Tarcza
*Assistant Examiner*—Fred H Mull
(74) *Attorney, Agent, or Firm*—Nydegger & Associates

(57) ABSTRACT

A wireless system and method for locating the position of a movable signal emitter located inside or adjacent to a structure includes establishing at least three base station sites at known locations around the structure. The signal emitter then transmits an omni-directional, low frequency, RF signal that is received at the base station sites. Phase information is measured at each base station site and communicated to a central processing site. At the central processing site, relative phase delays are used to geometrically calculate the position of the signal emitter.

25 Claims, 2 Drawing Sheets

FIREFIGHTER LOCATOR

FIELD OF THE INVENTION

The present invention pertains generally to a system for locating and tracking moving objects. More particularly, the present invention pertains to systems and methods that are useful for locating the position of a person inside a structure. The present invention is particularly, but not exclusively, useful as a portable, accurate system capable of being rapidly setup to track and locate the position of firefighters inside a burning structure.

BACKGROUND OF THE INVENTION

There are many circumstances wherein there is a need to establish the accurate positioning and tracking of movable objects or individuals. This is particularly so when the individual or object is moving in a hostile or dangerous environment. One example is when a firefighter enters a structure during a rescue operation. In situations such as this, there is a need to determine the position of the firefighter from outside the structure with accuracies of approximately one meter. Although an object's position can be determined effectively outdoors using the current global positioning system (GPS), the GPS system is unsuitable, without augmentation, for locating moving objects indoors at accuracies of approximately one meter.

To accurately locate and track objects or individuals inside or adjacent to a structure, the tracking signal that is used by the system must have good penetration and little distortion through the walls and other features of the structures. Lack of adequate signal penetration can result in a loss of signal strength which in turn can cause unacceptable location errors. Also, the signal should have low deflection (refraction and diffraction) to reduce the presence of multipath signals which limit location accuracy. Further, to locate an object's position accurately indoors, a system must provide sufficient coverage, and be able to acquire the signals quickly.

Unfortunately, radiofrequency (RF) systems using high frequency signals are limited in their ability to penetrate the walls and features of a structure. Also, because high frequency signals have wavelengths that are much shorter than the size of typical structural features such as rooms, hallways and staircases, these features can act as waveguides for the high frequency waves, altering the path of the signal. On the other hand, low frequency RF signals offer the potential to penetrate the walls and features of a structure and overcome inaccuracies due to fading and path length perturbations caused by diffraction and reflection. Further, since the wavelength of the low frequency waves are approximately the same or greater than the size of typical structural features, the features do not act as waveguides. Consequently, low frequency RF signals having wavelengths approximating the size of structural features are preferred over high frequency signals for use in and around structures.

Traditional positioning technologies use time-of-arrival and the angle-of arrival methods. In a typical time-of-arrival system, the system measures the time of arrival of a marker modulated onto a signal to determine range. However, in time-of-arrival systems, increased resolution can only be obtained at the expense of increased bandwidth. By way of example, for a desired locating accuracy of one meter, a ranging system based on time of arrival would require a bandwidth on the order of tens of MHz. Unfortunately, this much bandwidth (tens of MHz) is unavailable at the low frequencies required for indoor use.

Another traditional positioning technology is the angle-of-arrival system. Typically, the angle of arrival is measured with array antennas or spinning real-aperture antennas. To achieve an unambiguous angle measurement commensurate with a one meter cross-range resolution at a one kilometer distance, each individual antenna (or array) must be on the order of 15 wavelengths across. Consequently, for the low frequency RF signals required for indoor locating, each antenna would be quite large and costly. Further, such large antennas would be unsuitable for a firefighter locator system which requires small, portable equipment that can be setup quickly.

Another technique for locating the position of an object includes establishing several known locations to receive a signal emitted from the object. By measuring the phase delay of a cyclostationary feature of the signal at each of the known locations, the position of the object can be determined. For example, U.S. Pat. No. 5,999,131 which issued to Sullivan for an invention entitled "Wireless Geolocation System," and which is assigned to the same assignee as the present invention, discloses a system for locating mobile phones within a cell which may comprise several square miles. Unlike a mobile phone system which broadcasts over relatively high frequencies and large distances, the present invention is focused on using low frequency RF signals having the ability to penetrate the walls and floors of structures. Further, whereas it is sufficient to locate a mobile phone within a cell to an accuracy of about 50 feet, the present invention is concerned with locating an object positioned inside a structure to an accuracy of one meter.

Considering the above, it is an object of the present invention to provide a wireless system for locating and tracking the position of a movable signal emitter situated inside a structure with accuracies of approximately one meter. Another object of the present invention is to provide a wireless system for accurately locating the position of a signal emitter that uses penetrating, low frequency RF signals, and requires only a minimal amount of bandwidth. Still another object of the present invention is to provide a wireless system for accurately locating and tracking the position of a plurality of signal emitters situated inside or adjacent to a structure. Yet another object of the present invention is to provide a wireless locating system that can incorporate a bi-directional data link and is simple to use, and comparatively cost effective.

SUMMARY OF THE PREFERRED EMBODIMENTS

In accordance with the present invention, a system and method for locating and tracking the position of a movable signal emitter that is situated inside a structure includes establishing at least three mutually dispersed base station sites outside the structure at known locations. For a multi-story structure, the system preferably includes three base station sites located at approximately ground level, and an additional base station site that is elevated. A central processing site is also included in the system, and a wireless link is provided to allow for communication from each of the base station sites to the central processing site.

To operate the system, the emitter is turned on to transmit a continuous low frequency (approximately 27 Mhz) RF signal. An omni-directional antenna mounted on the emitter allows for the transmission of the signal in all directions. Each base station site has an antenna for receiving the continuous signal. Preferably, each base station site is self-surveying by using either a global positioning system or other wireless method to accurately establish its position. The positions of the base station sites are then communicated to the central processing site for use in the algorithm which computes the position of the emitter.

In one embodiment of the present invention, each base station has access to a reference signal such as a signal that is in phase with the signal generated at the signal emitter. Based on this reference signal, each base station compares the actual signal that is received from the signal emitter to the reference signal in order to measure an actual phase delay at each station. For a given base station, the actual phase delay is indicative of the distance between the signal emitter and the base station. Although indicative of distance, phase-related ambiguities arise in converting the actual phase delay to a distance measurement due to the fact that one actual phase delay could represent more than one possible distance. It is to be appreciated that these possible distances differ by a distance that is related to the signal wavelength.

In this embodiment, the measured actual phase delay from each base station site is communicated to the central processing site. At the central processing site, the measured actual phase delay for a given base station can be converted into a set of possible emitter distances from that base station. This process can be repeated for each base station resulting in a set of possible emitter distances from each base station. Next, the processor can determine all possible points where the distance sets overlap using triangulation methods known in the pertinent art. This set of possible points includes the real emitter position and the ambiguities inherent in the phase-only system.

Next, the ambiguities can be eliminated by the processor to find the real emitter position. It is to be appreciated that the number of ambiguities will depend on the emitter signal wavelength and the coverage area. Several techniques can be used to reduce or eliminate the ambiguities. For example, increasing the number of base stations will generally reduce the number of ambiguities. Another technique involves determining an initial position for the emitter and tracking the movement of the emitter. This technique allows for some of the ambiguous positions to be eliminated as improbable in light of any known limitations on emitter movement such as speed. Another technique involves using an algorithm known in the pertinent art such as the maximum likelihood method (MLM). Another technique for eliminating ambiguities involves using an emitter that transmits multiple frequencies. Here, each frequency produces a set of possible emitter positions. The set of possible positions produced at one frequency can be compared to the set of possible positions produced at a second frequency and any positions that are not common to both sets can be eliminated as ambiguities. Once the ambiguities have been eliminated, the remaining point is the real position of the signal emitter relative to the base station sites.

In another embodiment of the present invention, rather than actual phase delays, relative phase delays from one base station to another can be used to locate the position of a signal emitter. In this embodiment, the location of each base station is known and each base station is synchronized with the other base stations. Synchronization between the emitter and the base stations is not necessary. Each base station measures the phase angle of the emitter signal and records a measurement time. These data are transferred to the central processing site where the processor calculates a set of relative phase delays. Alternatively, the base stations can relay the received signals to the central processing site where the phase angles and measurement times can be determined and used to calculate a set of relative phase delays. For this purpose, the received signal can be time shifted or frequency shifted at the base station and the shifted signal relayed to the central base site thereby reducing signal interference.

For a three receiver system, three relative phase delays can be calculated; a first for base stations one and two, a second for base stations two and three and a third for base stations one and three. Each relative phase delay is indicative of a differential range estimate for the two base stations used to establish the relative phase delay. For example, consider an emitter signal having a wavelength, $\lambda$. Based on a relative phase delay of one-half $\lambda$ measured between base station one and base station two, the processor can establish the set of points wherein the distance from base station one is one-half $\lambda$ greater than the distance from base station two (differential range estimate). Absent any phase-related ambiguities, the emitter must be located at one of these points. Similarly, the processor can establish a differential range estimate for each of the other base station combinations and use the differential range estimates to locate the position of the signal emitter using triangulation algorithms known in the pertinent art. Depending on the signal wavelength and the coverage area, these differential range estimates may contain phase-related ambiguities requiring techniques outlined above such as emitter initialization or using an MLM algorithm to reduce or eliminate the ambiguities.

As contemplated by the present invention, in addition to locating a stationary emitter, the path of a moving signal emitter can be tracked. To track a moving signal emitter, the base stations must be synchronized, and the actual or relative phase delays must be measured simultaneously at predetermined measurement times. This allows the central processing site to calculate an emitter position for each measurement time, and thereby track the position of a moving emitter.

Also in accordance with the method and system of the present invention, a plurality of movable signal emitters can be located and tracked inside and around a structure. Any multiple access protocol known in the pertinent art such as frequency division multiple access (FDMA), code division multiple access (CDMA) or time division multiple access (TDMA) can be used for this purpose. Each base station can include a filter to separate the signals from the plurality of emitters by frequency, code or time. After separation, the actual or relative phase delays for each emitter can be determined for calculation of the location of each emitter relative to the base station sites.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which.

DESCRIPTION OF THE PREFERRED EMBODIMENT

Figure 1:
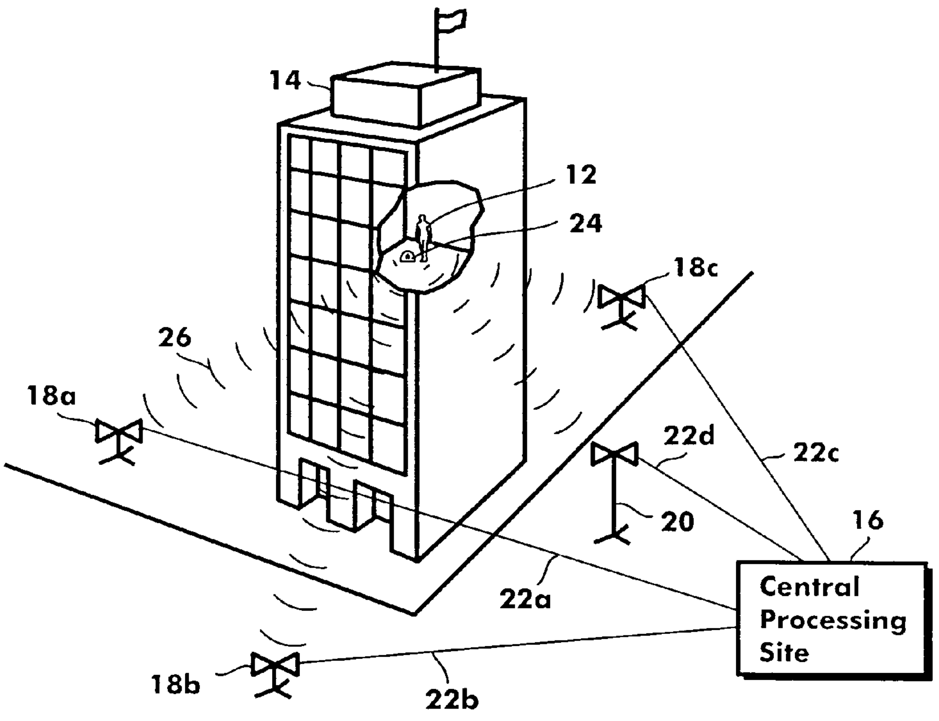
FIG. 1 is a schematic representation of a system of the present invention showing a firefighter equipped with an emitter situated inside a structure, and showing the base station sites and central processing site used to locate and track the position of the firefighter.

Referring initially to FIG. 1, a firefighter locator system in accordance with the present invention is shown and generally designated 10. As shown in FIG. 1, system 10 can be used to determine the position of a firefighter 12 located inside a multistory structure 14. In accordance with the present invention, system 10 preferably includes a central processing site 16, three ground-level base station sites 18 (of which the sites 18*a*, 18*b* and 18*c* are exemplary) and an elevated base station site 20. The base station sites 18*a–c*, and 20 which are shown in FIG. 1 are arbitrarily located and are only representative of base station sites 18, 20 which can be used in system 10 for the present invention. Indeed, it is to be appreciated that the actual positioning of the base station sites 18, 20 is generally unimportant so long as they are mutually dispersed and their exact location is known.

It is contemplated for the present invention that the base station sites 18, 20 will generally be located outside of the structure 14. It is further contemplated for the present invention that at least three base station sites 18, 20 are required to accurately determine the position of a movable object such as a firefighter 12 inside a single-story structure (not shown). For a multistory structure 14, four or more base station sites 18, 20 are preferred, with at least one elevated base station site 20. FIG. 1 also shows that each base station site 18*a–c*, 20 is in direct communication with the central processing site 16 by a respective communications link 22*a–d*. For purposes of the present invention, the communication links 22*a*, 22*b*, 22*c* and 22*d* are preferably wireless channels, but can be of any type well known in the pertinent art such as a land line.

The basic object of the system 10 is to accurately determine the position of a signal emitter 24 relative to the base station sites 18, 20. Further, this is to be accomplished regardless of whether the signal emitter 24 is stationary or mobile (i.e. being carried by firefighter 12). For the present invention, the signal emitter 24 can be any type of communications equipment which emits omni-directional, electromagnetic radiation signals 26 (e.g. radiofrequency (RF) signals). It is contemplated for the present invention that a low frequency RF signal 26, capable of penetrating the walls and structure of a building is used. Preferably, the signal 26 has a wavelength that is approximately the same or larger size than typical structural features such as hallways, staircases and room dimensions to prohibit these features from acting as a waveguide. For example, a signal 26 with a frequency of approximately 27 Mhz may be used. Also contemplated for the present invention, each signal emitter 24 may have the capability to broadcast both a vertically polarized signal and a horizontally polarized signal. It is to be appreciated that certain horizontally or vertically oriented features of the structure 14 will reflect or diffract signals differently depending on whether the signal is horizontally or vertically polarized. By using both horizontally and vertically polarized signals, position errors due to these oriented features of the structure 14 can be eliminated.

Figure 2:
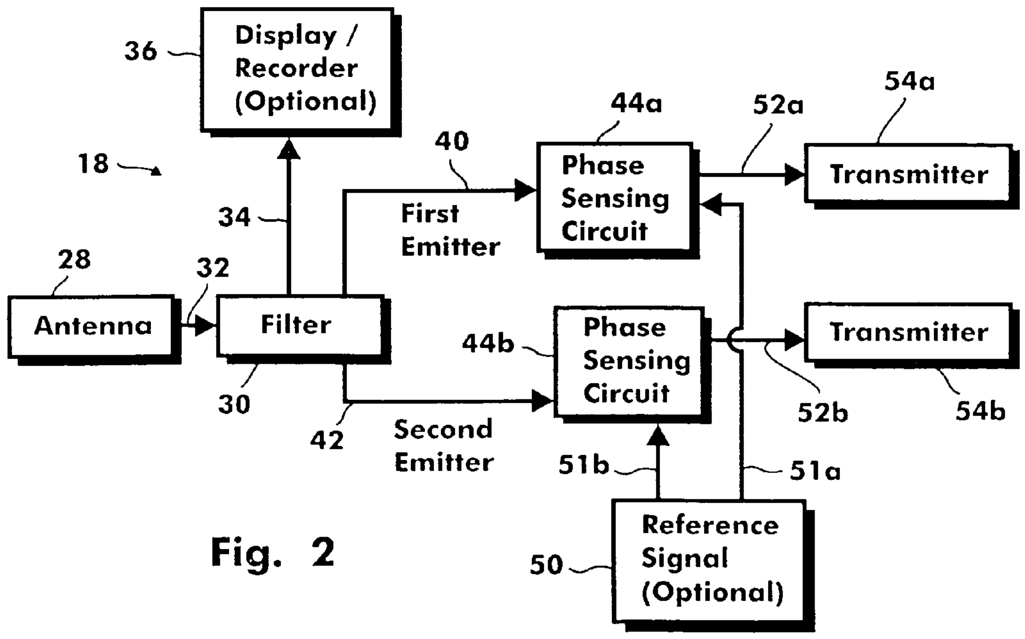
FIG. 2 is a functional block diagram showing the interactive components of a representative base station site for the present invention.

The operation of a representative base station site 18, 20 can be best understood by cross-referencing FIGS. 1 and 2. In FIG. 2, it is to be appreciated that a base station 18, 20 includes an antenna 28 for receiving signals 26 from the signal emitters 24 (e.g. emitter "A" and emitter "B"). It is contemplated for the present invention that the system 10 is able to track and locate several signal emitters 24 at once. For example, each signal emitter 24 may broadcast a unique frequency. For the present invention, any multiple access protocol known in the pertinent art such as frequency division multiple access (FDMA), code division multiple access (CDMA) or time division multiple access (TDMA) can be used to allow each base station 18, 20 to process signals 26 from a plurality of signal emitters 24 contemporaneously.

In the preferred embodiment of the present invention, each emitter 24 may include the capability of broadcasting non-position data which can be received by the antenna 28 at each base station site 18, 20. Accordingly, each signal 26 from each emitter 24 may contain both a positioning component and a non-positioning component. Non-position data may include sensor measurements made near the emitter 24 such as oxygen level, carbon monoxide level or temperature. Additionally, firefighter heart rate, air tank level, motion, battery level or similar measurements may be measured by sensors and transmitted to the base station 18, 20.

Once the signals 26 are received at the antenna 28 from each signal emitter 24, the signals 26 and their components must be sorted. FIG. 2 shows that the base station 18, 20 may contain a filter 30 for sorting the received signals 26. As shown in FIG. 2, the signals 26 received at the antenna 28 can be communicated over line 32 to the filter 30 for separation. When a non-position data channel is used, the sorted data can be communicated over line 34 from the filter 30 to a display/recorder 36.

Once separated, the position signals 26 from each signal emitter 24 can be communicated to a phase sensing circuit 44. As shown in FIG. 2, the separated signal 26 from a first emitter 24 can be communicated over line 40 to a phase sensing circuit 44*a*, and the separated signal 26 from a second emitter 24 can be communicated over line 42 to a phase sensing circuit 44*b*.

In one embodiment of the present invention, an actual phase delay ($\tau_A$) for the signal 26 can be determined at the phase sensing circuit 44. In this embodiment, the signal 26 is compared to a reference signal 50 to determine the actual phase delay ($\tau_A$) of each emitter signal 26. As shown in FIG. 2, the reference signal 50 can be communicated over lines 51*a,b* to each phase sensing circuit 44. For this embodiment of the present invention, the reference signal 50 is synchronized with the signal emitter 24. In this embodiment, the actual phase delay ($\tau_A$) determined by each phase sensing circuit 44 is indicative of the distance (range) between the signal emitter 24 and the base station 18, 20 that receives the signal 26. Once determined, the actual phase delay ($\tau_A$) for each signal 26 received at a base station 18, 20 can be communicated from each phase sensing circuit 44 over a line 52*a,b* to a transmitter 54*a,b*. The transmitter 54*a,b* allows the actual phase delay ($\tau_A$) data to be sent from the base station site 18, 20 to the central processing site 16 over the communication link 22. As described in detail below, the central processing site 16 processes the actual phase delays ($\tau_A$) from each base station site 18, 20 to geometrically determine the position of each signal emitter 24 relative to the base station sites 18, 20.

In another embodiment, position information can be obtained without synchronizing the reference signal 50 at each base station site 18, 20 with the signal emitter 24. Rather than measuring actual phase delays at each base station 18, 20, a relative phase delay ($\tau_R$) can be determined by comparing the signal 26 received at one base station site 18, 20 with the signal 26 received at a second base station site 18, 20. By comparing each base station 18, 20 to at least one other base station 18, 20, a set of relative phase delays ($\tau_R$) can be obtained and used to find the location of the signal emitter 24. In this embodiment, each base station 18, 20 has a reference signal 50 that is synchronized with the reference signal 50 at each of the other base stations 18, 20. The phase sensing circuit 44 measures the phase of the signal 26 and the reference signal 50 is used to obtain a measurement time. Once determined, the phase and measurement time for each signal 26 received at a base station 18, 20 can be communicated from each phase sensing circuit 44 over a line 52*a,b* to a transmitter 54*a,b*. The transmitter 54*a,b* allows the phase and measurement time to be sent from the base station site 18, 20 to the central processing site 16 over the communication link 22.

At the central processing site 16, a relative phase delay ($\tau_R$) can be calculated by comparing the phase and time measurement data received from one base station site 18, 20 with the phase and time measurement data received from a second base station site 18, 20. In this embodiment, each relative phase delay ($\tau_R$) determined at the central processing site 16 is indicative of the differential range between the signal emitter 24 and the two base stations 18, 20 used to calculate the relative phase delay ($\tau_R$). Stated differently, each relative phase delay ($\tau_R$) indicates that the signal emitter 24 may be further from one base station 18, 20 than another base station 18, 20, and indicates the magnitude of this difference. By comparing each base station 18, 20 to at least one other base station 18, 20, a set of relative phase delays (ER) can be obtained. As described in detail below, this set of relative phase delays ($\tau_R$) can be used to geometrically determine the position of each signal emitter 24 relative to the base station sites 18, 20.

In yet another embodiment, each base station 18, 20 can relay the received signals 26 to the central processing site 16 for calculation of either actual or relative phase delays ($\tau$). Since the distance between each base station 18, 20 and the central processing site 16 is known, the phase delay due to the signal travel between the base station 18, 20 and the central processing site 16 can be eliminated using processing techniques known in the pertinent art. At the central processing site 16, the relayed signals can be compared directly to calculate a set of relative phase delays ($\tau_R$) or the central processing site 16 can include a reference signal in phase with the signal emitter 24 to allow calculation of actual phase delays ($\tau_A$). For this purpose, the received signal 26 can be time shifted or frequency shifted at the base station 18, 20 and the shifted signal relayed to the central processing site 16 thereby reducing signal interference.

Figure 3:
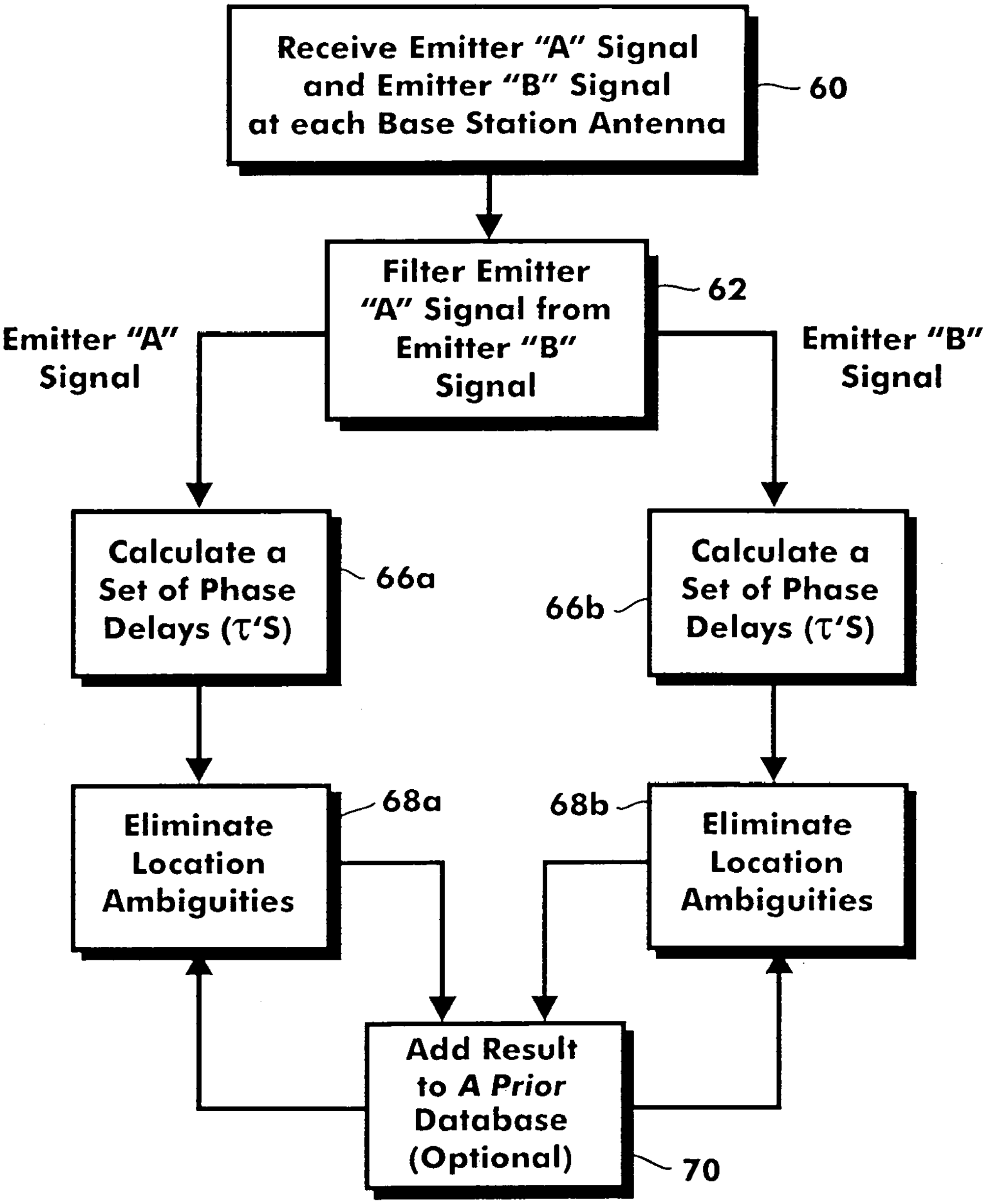
FIG. 3 is a functional block diagram setting forth the sequential steps performed during operation of the system of the present invention.

The operation of system 10 of the present invention will, perhaps, be best understood by cross-referencing FIGS. 2 and 3. Block 60 indicates that the antenna 28 at each base station site 18, 20 receives the low frequency signals 26 from the signal emitters 24 (e.g. emitter "A" and emitter "B"). Next, as indicated by block 62, the signals 26 from the signal emitters 24 are separated using a filter 30. As shown in blocks 66*a,b*, once separated, the signals 26 can be used to calculate either actual or relative phase delays ($\tau$). As indicated above, if actual phase delays ($\tau_A$) are used, they can be calculated at either the base station 18, 20 or the central processing site 16. If relative phase delays ($\tau_R$) are used, they are calculated at the central processing site 16. At the central processing site 16, each calculated phase delay ($\tau$) is converted into a set of possible locations where the signal emitter 24 may be. If actual phase delays ($\tau_A$) are used, each actual phase delay ($\tau_A$) is converted into a set of possible locations that indicate distance from the corresponding base station 18, 20. If relative phase delays ($\tau_R$) are used, each relative phase delay ($\tau_R$) is converted into a set of possible locations that indicate a differential range for the corresponding base stations 18, 20 used to determine the relative phase delay ($\tau_R$).

In either case, the conversion of phase delays to distance measurements results in phase-related ambiguities that increase the number of possible locations represented by each phase delay. Specifically, each actual phase delay ($\tau_A$) represents a plurality of ranges from the base station 18, 20. It is to be appreciated that these ranges differ by a distance related to the wavelength of the signal 26. Similarly, each relative phase delay ($\tau_R$) represents a plurality of differential ranges for the base stations 18, 20 used to calculate the relative phase delay ($\tau_R$). It is to be appreciated that the distances between these differential ranges are related to the wavelength of the signal 26.

Once each phase delay ($\tau$) is converted into a set of possible locations for the signal emitter 24, the processor can determine all possible points where the distance sets overlap using triangulation methods known in the pertinent art. This set of possible points includes the real position of the signal emitter 24 and the ambiguities inherent in the phase-only system.

Next, as shown in blocks 68*a,b*, the ambiguities can be eliminated by the processor to find the real position of the signal emitter 24. It is to be appreciated that the number of ambiguities will depend on the wavelength of the signal 26 and the size of the area in which the signal emitter 24 may be found. Several techniques can be used to reduce or eliminate the ambiguities. For example, increasing the number of base stations 18, 20 will generally reduce the number of ambiguities. Another technique involves determining an initial position for the signal emitter 24 and tracking the movement of the signal emitter 24. This technique allows for some of the ambiguous positions to be eliminated as improbable in light of any known limitations on signal emitter 24 mobility. Block 70 shows that an a prior database can be used to record the result of each position determination for use in a subsequent position determination. Another technique to reduce or eliminate phase-related ambiguities involves using an algorithm known in the pertinent art such as the maximum likelihood method (MLM). Another technique for eliminating ambiguities involves using a signal emitter 24 that transmits two or more signals 26 contemporaneously, each signal 26 having a different frequency. Since each frequency produces a different set of possible positions for the signal emitter 24, the set of possible positions produced at one frequency can be compared to the set of possible positions produced at a second frequency and any positions that are not common to both sets can be eliminated as ambiguities. Additionally, a combination of the above techniques can be used to eliminate phase-related ambiguities. Once the ambiguities have been eliminated, the remaining point is the real position of the signal emitter 24 relative to the base station sites 18, 20.

While the particular Firefighter Locator system and method as herein shown and disclosed in detail is fully capable of obtaining the objects and providing the advantages herein before stated, it is to be understood that it is merely illustrative of the presently preferred embodiments of the invention and that no limitations are intended to the details of construction or design herein shown other than as described in the appended claims.

What is claimed is:

1. A wireless system for determining the location of a moveable object positioned in a structure, said structure having structural features, with each structural feature characterized by a determinable feature size, said system comprising:

a signal emitter coupled to said object, said emitter for broadcasting a signal having a wavelength, λ;

a means on said emitter for selectively setting the emitter signal wavelength, λ, with the selected wavelength, λ, being longer than said feature size wherein a signal path distortion of said signal is caused by said structure and is characterized by said signal wavelength, λ;

at least three mutually dispersed base station sites for receiving said signal from said signal emitter at each base station site;

at least one phase sensing circuit for determining phase information for each received signal, said phase information being dependent on said signal path distortion; and a central processing site connected in communication with each said base station site, said central processing site having a processor for using said phase information to determine the location of said signal emitter relative to each said base station site.

2. A system as recited in claim 1 wherein said at least one phase sensing circuit is a plurality of phase sensing circuits, with one said phase sensing circuit located at each said base station site, and wherein each said base station site further comprises a reference signal synchronized with said signal emitter and in communication with said phase sensing circuit, and wherein said phase information is an actual phase delay.

3. A system as recited in claim 1 wherein said at least one phase sensing circuit is a phase sensing circuit located at said central processing site, and wherein said central processing site further comprises a reference signal synchronized with said signal emitter and in communication with said phase sensing circuit, and wherein each said base station site has a transmitter for relaying said received signal to said central processing site, and wherein said phase information is an actual phase delay.

4. A system as recited in claim 1 wherein said at least one phase sensing circuit is a phase sensing circuit located at each said base station site, and wherein each said base station site further comprises a reference signal for synchronizing said base stations, and wherein said phase information is a phase measurement and a measurement time.

5. A system as recited in claim 1 wherein said processor uses said phase information to calculate at least one relative phase delay to determine the location of said signal emitter relative to each said base station site.

6. A system as recited in claim 1 wherein said at least one phase sensing circuit is a phase sensing circuit located at said central processing site, and wherein each said base station site has a transmitter for relaying said received signal to said central processing site, and wherein said phase information is a relative phase delay.

7. A system as recited in claim 1 wherein said three mutually dispersed base station sites lie substantially in a common plane, and further comprising a fourth base station site, said fourth base station site lying substantially outside of said common plane.

8. A system as recited in claim 1 wherein each said base station site further comprises:

a means for self-surveying; and a means for communicating the position of each base station to said central processing site.

9. A system as recited in claim 8 wherein said means for self-surveying is a global positioning system.

10. A system as recited in claim 1 wherein said communication between said base station sites and said central processing site is wireless.

11. A system as recited in claim 1 wherein said signal emitter is a first signal emitter and said signal is a first signal and further comprising a second signal emitter for emitting a second signal, and wherein said first signal emitter has a means for modulating a first emitter identification code onto said first emitter signal and said second signal emitter has a means for modulating a second emitter identification code onto said second emitter signal, and wherein each said base station site has a filter to separate said first emitter signal from said second emitter signal.

12. A system as recited in claim 1 wherein said signal emitter is a first signal emitter and said signal is a first signal and further comprising a second signal emitter for emitting a second signal, and wherein said first emitter signal and said second emitter signal have different frequencies, and wherein each said base station site has a filter to separate said first emitter signal from said second emitter signal.

13. A system as recited in claim 1 wherein said signal emitter is a first signal emitter and said signal is a first signal and further comprising a second signal emitter for emitting a second signal, and wherein each said base station site has a time division multiple access filter to allow a portion of said first emitter signal and a portion of said second emitter signal to be received at each said base station site.

14. A system as recited in claim 1 wherein said signal has a frequency of approximately 27 Mhz.

15. A system as recited in claim 1 wherein said signal is a first signal having vertical polarization and wherein said signal emitter further broadcasts a second signal having horizontal polarization, and wherein each said base station site has a filter to separate said first emitter signal from said second emitter signal.

16. A method for locating the position of a moveable object situated inside a structure having structural features, with each structural feature characterized by a determinable feature size, which comprises the steps of:

coupling a signal emitter to said object, said emitter for broadcasting a signal having a wavelength, λ;

a means on said emitter for selectively setting the emitter signal wavelength, λ, with the selected wavelength, λ, being longer than said feature size, wherein a signal path distortion of said signal is caused by said structure and is characterized by said signal wavelength, λ;

receiving said signal from said signal emitter by at least three mutually dispersed base station sites, each said base station site being located outside said structure;

determining at least three relative phase delays, each relative phase delay representing a unique combination of two said base station sites, each said relative phase delay being dependent on said signal path distortion; and comparing said at least three relative phase delays to obtain a set of possible signal emitter locations.

17. A method as recited in claim 16 wherein no two base station sites are spaced closer than one said wavelength, λ, apart.

18. A method as recited in claim 16 further comprising the step of eliminating at least one phase-related ambiguity in said set of possible signal emitter locations.

19. A method as recited in claim 18 wherein said step of eliminating at least one phase-related ambiguity uses a prior information.

20. A method as recited in claim 18 wherein said step of eliminating at least one phase-related ambiguity uses a maximum likelihood method algorithm.

21. A wireless system for locating a movable object positioned in a structure having structural features, with each structural feature characterized by a determinable feature size, and receiving information therefrom which comprises:

a signal emitter coupled to said object, said emitter for broadcasting a positioning signal having a wavelength, $\lambda$;

a means on said emitter for selectively setting the emitter signal wavelength, $\lambda$, with the selected wavelength, $\lambda$, being longer than said feature size, and a data signal, wherein a signal path distortion of said signal is caused by said structure and is characterized by said signal wavelength, $\lambda$;

at least three mutually dispersed base station sites, each said base station site for receiving said positioning signal and said data signal from said signal emitter, each said base station site having a multiple access protocol filter to separate said positioning signal from said data signal and a phase sensing circuit for determining phase information for each received positioning signal, said phase information being dependent on said signal path distortion; and a central processing site connected in communication with each said base station site, said central processing site having a processor for using said phase information to determine the location of said signal emitter relative to each said base station site.

22. A system as recited in claim 21 wherein said multiple access protocol is code division multiple access (CDMA).

23. A system as recited in claim 21 wherein said multiple access protocol is time division multiple access (TDMA).

24. A system as recited in claim 21 wherein said multiple access protocol is frequency division multiple access (FDMA).

25. A system as recited in claim 21 wherein said data signal contains information measured by a sensor selected from a group consisting of an oxygen sensor, a carbon monoxide sensor, a temperature sensor, an air tank level sensor, a heat rate sensor, a motion sensor and a battery level sensor.

* * * * *

UNITED STATES PATENT AND TRADEMARK OFFICE

CERTIFICATE OF CORRECTION

PATENT NO. : 6,965,344 B1
DATED : November 15, 2005
INVENTOR(S) : J. Doss Halsey and Douglas J. Wolff It is certified that error appears in the above-identified patent and that said Letters Patent is hereby corrected as shown below:

Column 7,
Line 30, delete "(ER)" insert -- $(\tau_R)$ --.

Column 8,
Line 38, delete "a prior" to -- *a prior* --.

Column 10,
Line 66, delete "a prior" to -- *a prior* --.

Signed and Sealed this

Thirty-first Day of January, 2006

JON W. DUDAS
*Director of the United States Patent and Trademark Office*